US009992663B2

(12) United States Patent
Yang et al.

(10) Patent No.: US 9,992,663 B2
(45) Date of Patent: Jun. 5, 2018

(54) METHODS AND NODES FOR HANDLING UPDATED SUBSCRIBER DATA

(71) Applicant: Telefonaktiebolaget LM Ericsson (publ), Stockholm (SE)

(72) Inventors: Yong Yang, Kållered (SE); Roland Gustafsson, Bengtsfors (SE); Gunnar Rydnell, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/511,187

(22) PCT Filed: Sep. 26, 2014

(86) PCT No.: PCT/EP2014/070705
§ 371 (c)(1),
(2) Date: Mar. 14, 2017

(87) PCT Pub. No.: WO2016/045755
PCT Pub. Date: Mar. 31, 2016

(65) Prior Publication Data
US 2017/0280314 A1    Sep. 28, 2017

(51) Int. Cl.
*H04W 4/00* (2009.01)
*H04W 8/12* (2009.01)
(Continued)

(52) U.S. Cl.
CPC .............. *H04W 8/12* (2013.01); *H04W 8/06* (2013.01); *H04W 8/18* (2013.01); *H04W 24/02* (2013.01); *H04W 76/027* (2013.01); *H04W 76/18* (2018.02)

(58) Field of Classification Search
CPC ... H04W 28/24; H04W 48/16; H04W 84/045; H04W 8/04; H04W 12/06;
(Continued)

(56) References Cited

U.S. PATENT DOCUMENTS

2010/0075635 A1    3/2010  Lim et al.
2012/0300242 A1*  11/2012  Meike ................... G06F 3/1219
                                                358/1.13
(Continued)

FOREIGN PATENT DOCUMENTS

KR    20100034885 A    4/2010

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.5.0, 3GPP Organizational Partners, Jun. 2014, 305 pages.

(Continued)

*Primary Examiner* — Fred Casca
(74) *Attorney, Agent, or Firm* — Withrow & Terranova, PLLC

(57) ABSTRACT

The embodiments herein relate to a method in a first mobility management node for handling updated subscriber data associated with a UE. The UE is currently unreachable by the first mobility management node. The first mobility management node receives, from a subscriber database, updated subscriber data associated with the UE. At least part of the updated subscriber data is modified. The first mobility management node determines that transmission of the updated subscriber data to a gateway node should be postponed until the UE has become reachable.

18 Claims, 10 Drawing Sheets

(51) Int. Cl.
*H04W 76/02* (2009.01)
*H04W 8/06* (2009.01)
*H04W 8/18* (2009.01)
*H04W 24/02* (2009.01)

(58) Field of Classification Search
CPC . H04W 36/0011; H04W 36/12; H04W 36/14; H04W 4/24; H04W 76/027; H04W 8/12; H04W 40/24; H04W 60/00; H04W 60/04; H04W 76/02
USPC ......... 455/433, 550.1, 406, 418, 419, 432.1, 455/432.3, 452.2, 466, 515; 379/114.28
See application file for complete search history.

(56) References Cited

U.S. PATENT DOCUMENTS

| | | | | |
|---|---|---|---|---|
| 2013/0102343 | A1* | 4/2013 | Shaw | H04L 47/762 455/509 |
| 2013/0148492 | A1* | 6/2013 | Liao | H04W 4/005 370/218 |
| 2015/0117320 | A1* | 4/2015 | Wang | H04L 12/1407 370/329 |
| 2016/0286451 | A1* | 9/2016 | Ahmad | H04W 36/12 |

OTHER PUBLICATIONS

International Search Report and Written Opinion for International Patent Application No. PCT/EP2014/070705, dated May 21, 2015, 10 pages.
International Preliminary Report on Patentability for International Patent Application No. PCT/EP2014/070705, dated Sep. 8, 2016, 7 pages.
Author Unknown, "Technical Specification Group Services and System Aspects; General Packet Radio Service (GPRS); Service description; Stage 2 (Release 12)," Technical Specification 23.060, Version 12.0.0, 3GPP Organizational Partners, Mar. 2013, 338 pages.
Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," Technical Specification 29.274, Version 12.0.0, 3GPP Organizational Partners, Mar. 2013, 228 pages.
Author Unknown, "Technical Specification Group Core Network and Terminals; General Packet Radio Service (GPRS); GPRS Tunnelling Protocol (GTP)across the Gn and Gp interface (Release 12)," Technical Specification 29.060, Version 12.0.0, 3GPP Organizational Partners, Mar. 2013, 176 pages.
Author Unknown, "Technical Specification Group Services and System Aspects; Machine-Type and other mobile data applications Communications enhancements (Release 12)," Technical Specification 23.887, Version 1.2.0, 3GPP Organizational Partners, Aug. 2013, 153 pages.
Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.0.0, 3GPP Organizational Partners, Mar. 2013, 290 pages.
Grant of Patent for Korean Patent Application No. 10-2017-7011442, dated Jun. 20, 2017, 2 pages.

* cited by examiner

METHODS AND NODES FOR HANDLING UPDATED SUBSCRIBER DATA

This application is a 35 U.S.C. § 371 national phase filing of International Application No. PCT/EP2014/070705, filed Sep. 26, 2014, the disclosure of which is incorporated herein by reference in its entirety.

TECHNICAL FIELD

Embodiments herein relate generally to a first mobility management node, a method in the first mobility management node, a second mobility management node and a method in the second mobility management node. More particularly the embodiments herein relate to handling updated subscriber data associated with a User Equipment (UE).

BACKGROUND

Circuit Switched (CS) FallBack (CSFB) and Single Radio Voice Call Continuity (SRVCC) are features that were introduced in Third Generation Partnership Project (3GPP) Release 8.

The CSFB in Evolved Packet System (EPS) enables the provisioning of voice and other domain services by reuse of CS infrastructure when a UE is served by Evolved-Universal Terrestrial Radio Access Network (E-UTRAN), i.e. using a CS network to provide voice services alongside of an Long Term Evolution (LTE) network, i.e. a Packet Switched (PS) network. A CSFB enabled UE, connected to E-UTRAN may use GERAN or UTRAN to connect to the CS domain. This function is only available in case E-UTRAN coverage is overlapped by either GERAN coverage or UTRAN coverage. GERAN is short for GSM EDGE Radio Access Network, GSM is short for Global System for Mobile communications, EDGE is short for Enhanced Data rates for Global Evolution and UTRAN is short for Universal Terrestrial Radio Access Network. In other words, CSFB is a mechanism where the LTE network moves the UE to a legacy network which supports voice call. CSFB is used if the Internet protocol Multimedia Subsystem (IMS) network is not available or if the UE is not able to do Voice over LTE (VoLTE) for some reason (for example registration to the IMS network failed). The term VoLTE is used to describe voice and Short Message Service (SMS) in LTE. The term legacy network is used to refer to any older network, i.e. a network which is older than the current network, a network based on older network standards than the current network standard.

SRVCC is defined by the 3GPP as "Voice call continuity between IMS over PS access and CS access for calls that are anchored in IMS when the UE is capable of transmitting/receiving on only one of those access networks at a given time". SRVCC is a process where an active voice call in LTE is handed over to the CS domain of the legacy network. This may be useful when the UE is in an LTE coverage area and have an active voice call over IMS and the UE moves out of the LTE area into a legacy only network coverage. Instead of the call getting dropped, the same will be handed over to the CS legacy network if SRVCC is supported.

When the UE is not reachable by e.g. a PS network, the UE may be in suspend state or power saving state, or the serving mobility management node has cleared a Paging Proceed Flag (PPF) flag for the UE. When the PPF is cleared its value may be set to "false" or to the value 0 or similar which indicates that the flag is cleared. When the UE gets into suspend state, the mobility management node (e.g. a Mobility Management Entity (MME) and/or a Serving General packet radio service Support Node (SGSN)) will inform the gateway node (e.g. Serving GateWay (SGW) and/or Packet data network GateWay (PGW)) about the suspension. When the UE is in suspended state, UE does not send any user data nor does the UE send any signaling information. When the UE is in suspend state, the UE may be unavailable in the PS domain for PS services due to that the UE is in service in the CS domain (for a UE or network that cannot do CS and PS at the same time). The power saving state was introduced by 3GPP in Release 12. The UE may enter power saving state on its own initiative, and the UE may wake up at the next periodic Tracking Area Update (TAU) message or the next Routing Area Update (RAU) message, or if the UE has any uplink data or signaling to send. Information indicating that the UE is entering power saving state is not reported to gateway nodes such as the SGW or PGW. When the UE is unreachable (i.e. not reachable) it does not hear any paging that is sent to it by the MME/SGSN, and will therefore not answer. When the UE gets into a power saving state, the MME/SGSN is the only network node which holds information about the UE being in the power saving state. According to the existing requirement, if the MME/SGSN has received some network signaling this may trigger further signaling towards the unreachable UE. Such further signaling from the MME/SGSN towards the unreachable UE may be deemed failed.

SUMMARY

An objective of embodiments herein is therefore to obviate at least one of the above disadvantages and to provide optimized signaling.

According to a first aspect, the object is achieved by a method in a first mobility management node for handling updated subscriber data associated with a UE. The UE is currently unreachable by the first mobility management node. The first mobility management node receives, from a subscriber database, updated subscriber data associated with the UE. At least part of the updated subscriber data is modified. The mobility management node determines that transmission of the updated subscriber data to a gateway node should be postponed until the UE has become reachable.

According to a second aspect, the object is achieved by a method in a second mobility management node for handling updated subscriber data associated with the UE. The 15 second mobility management node determines that the UE has become reachable by the second mobility management node. The second mobility management node receives, from the first mobility management node, information about that there is updated subscriber data waiting to be transmitted to the gateway node, and receives the updated subscriber data from the subscriber database. At least part of the updated subscriber data is modified. The second mobility management node transmits the updated subscriber data to the gateway node.

According to a third aspect, the object is achieved by the first mobility management node for handling updated subscriber data associated with the UE. The UE is currently unreachable by the first mobility management node. The first mobility management node is configured to receive, from the subscriber database, updated subscriber data associated with the UE. At least part of the updated subscriber data is modified. The first mobility management node is configured to determine that transmission of the updated subscriber data to the gateway node should be postponed until the UE has become reachable.

According to a fourth aspect, the object is achieved by the second mobility management node for handling updated subscriber data associated with the UE. The second mobility management node is configured to determine that the UE has become reachable by the 35 second mobility management node. The second mobility management node is configured to receive, from the first mobility management node, information about that there is updated subscriber data waiting to be transmitted to the gateway node, and to receive the updated subscriber data from the subscriber database. At least part of the updated subscriber data is modified. The second mobility management node is configured to transmit the updated subscriber data to the gateway.

Since the transmission of the updated subscriber data is postponed until the UE is reachable, i.e. until it is able to communicate with the first mobility management node or the second mobility management node, the signalling from the gateway towards the UE will succeed. In other words, the signalling is optimized.

Embodiments herein afford many advantages, of which a non-exhaustive list of examples follows:

An advantage of the embodiments herein is that they provide a mechanism to avoid extra signaling which deemed failed upon receiving updated subscriber data initiated by a subscriber database when the UE is not reachable, e.g. when the UE suspends its PS service, when the UE gets into power saving mode, when the UE is out of coverage and the PPF is clear in the mobility management node. The embodiments herein avoid further complexities, error scenarios when the extra signaling is rejected.

The embodiments herein may be related to that a subscriber server needs to update information in several nodes in the network, such as e.g. the MME, PGW, Policy and Charging Rules Function (PCRF) etc. Since the transmission of the updated subscriber data is postponed until the UE becomes reachable, an advantage of the embodiments herein is that it is less likely that is necessary to store the data in the signaling request (to re-try) due to unsuccessful outcome of the procedure.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The exemplifying embodiments herein provide a mechanism in mobility management nodes for the handling of subscriber data transmission initiated by a subscriber database when the UE is not reachable, e.g. when the UE gets into suspend state or power saving mode.

Figure 1:
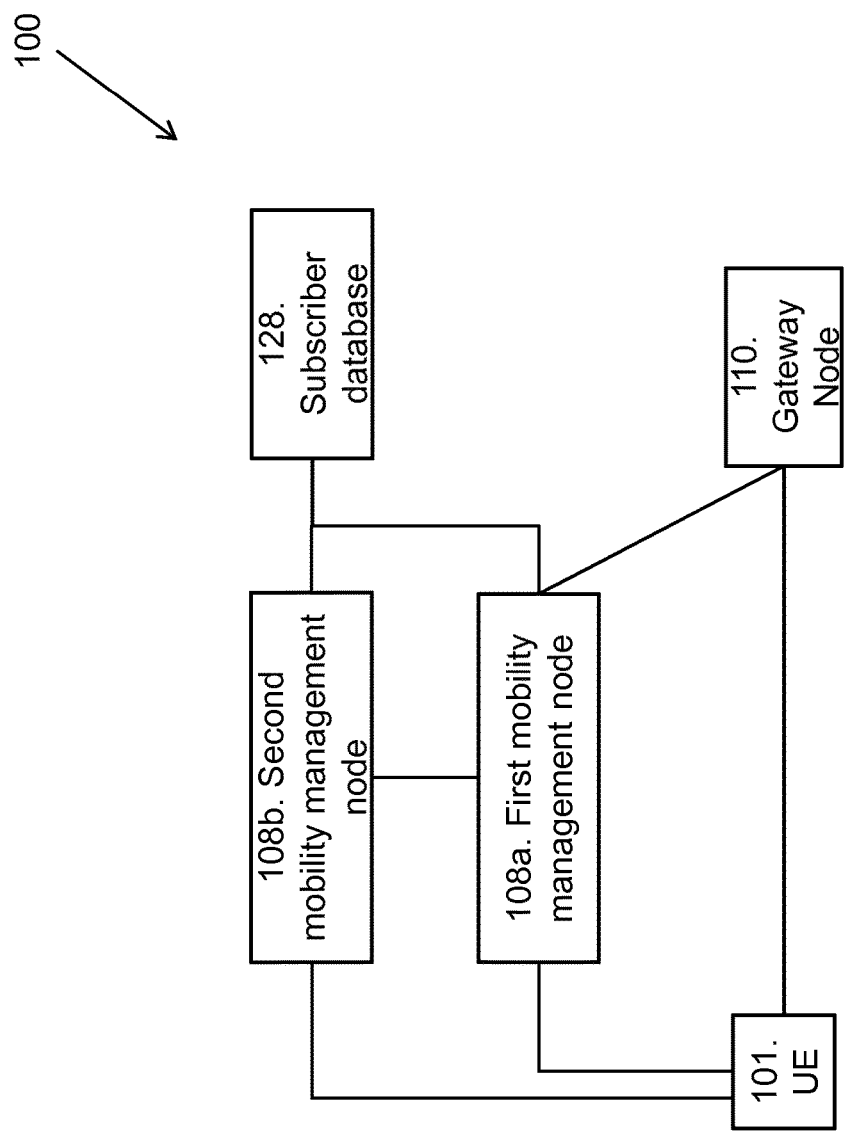
FIG. 1 is a schematic block diagram illustrating embodiments of a communications system.

FIG. 1 depicts an embodiment of a communications system 100 in which embodiments herein may be implemented. The communications system 100 may in some embodiments apply to one or more radio access technologies such as for example LTE, LTE Advanced, Wideband Code Division Multiple Access (WCDMA), GSM, or any other 3GPP radio access technology, or other radio access technologies such as e.g. Wireless Local Area Network (WLAN).

The communications system 100 seen in FIG. 1 comprises a UE 101. The UE 101 may be a device by which a subscriber may access services offered by an operator's network and services outside operator's network to which the operator's Radio Access Network (RAN) and Core Network (CN) provide access, e.g. access to the Internet. The UE 01 may be any device, mobile or stationary, enabled to communicate in the communications network, for instance but not limited to e.g. wireless device, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another device or a server.

Figure 2:
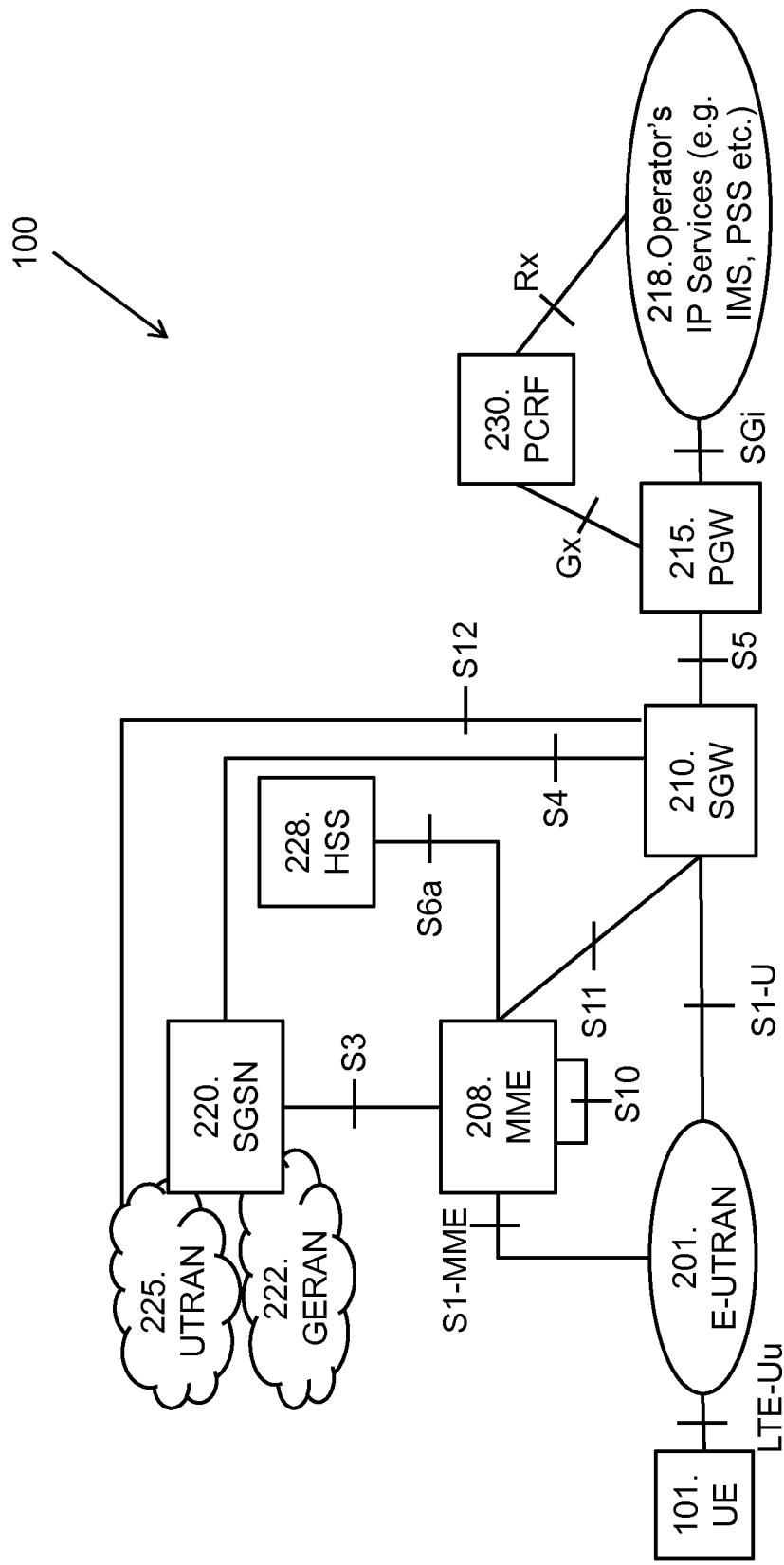
FIG. 2 is a schematic block diagram illustrating embodiments of a communications system.

The communications system 100 further comprises a first mobility management node 108a and a second mobility management node 108b. In some embodiments, the first mobility management node 108a is a first MME and the second mobility management node 108b is a second MME. In some embodiments, the first mobility management node 108a is a first SGSN and the second mobility management node 108b is a second SGSN. In some embodiments, the first mobility management node 108a is a first combined MME and SGSN node and the 35 second mobility management node 108b is a second combined MME and SGSN node. In some embodiments, the first mobility management node 108a may be referred to as an old mobility management node 108a and the second mobility management node 108b may be referred to as a new mobility management node. The first mobility management node 108a may be described as being the mobility management node that is currently serving the UE 101, i.e. serving the UE 101 at the start of the method that will be described below. The second mobility management node 108b may be described as being the mobility management node that is serving the UE 101 after the UE 101 has moved out of coverage from the first mobility management node 108a, e.g. after the UE 101 has been handed over to another network. In the following, the reference number 108 (without the letters a and b) refers to any of the first and second mobility management nodes 108a, 108b. Each of the first and second mobility management nodes 108a, 108b may be connected to a RAN (not shown), and the RAN may be wirelessly connected to and serving the UE 101. The RAN may e.g. be a GERAN a UTRAN or similar, or an E-UTRAN or similar as indicated in FIG. 2.

The communications system 100 comprises at least one gateway node 110. The gateway node 110 may be a SGW, a PGW, a combined SGW and PGW node or similar. The properties of a SGW and PGW node will be described in more detail below. In some embodiments, there may be two gateways 108, e.g. a SGW and a PGW. The gateway node 110 may be connected to the mobility management node 108. The gateway node 110 be connected to a RAN (not shown), and the RAN may be connected to and serving the UE 101.

A subscriber database 128 is connected to the mobility management node 108. The subscriber database may be e.g. a Home Subscriber Server (HSS) or a Home Location Register (HLR). The properties of the HSS and the HLR will be described in more detail below. The subscriber database 128 comprises subscriber related information, it may perform authentication and authorization of the user, and it may provide information about the subscriber's location and IP information etc. The subscriber related information may be e.g. charging characteristics, access restrictions, barring information, Access Point Name (APN), Quality of Service (QoS) profile, off load permissions etc.

An overview of some possible combinations of the nodes in the communications system 100 in FIG. 1 are seen in Table 1 below:

TABLE 1

| First mobility management node 108a | Second mobility management node 108b | Subscriber database 128 | Gateway node 110 |
|---|---|---|---|
| MME | MME | HSS | SGW |
| SGSN | SGSN | HSS | SGW |
| MME/SGSN | MME/SGSN | HSS | SGW |
| MME | MME | HSS | PGW |
| SGSN | SGSN | HSS | PGW |
| MME/SGSN | MME/SGSN | HSS | PGW |
| MME | MME | HSS | SGW/PGW |
| SGSN | SGSN | HSS | SGW/PGW |
| MME/SGSN | MME/SGSN | HSS | SGW/PGW |
| SGSN | SGSN | HLR | SGW |
| MME/SGSN | MME/SGSN | HLR | SGW |
| SGSN | SGSN | HLR | PGW |
| MME/SGSN | MME/SGSN | HLR | PGW |
| SGSN | SGSN | HLR | SGW/PGW |
| MME/SGSN | MME/SGSN | HLR | SGW/PGW |

Note that any other types of the nodes in the communications system 100 in addition to the ones exemplified in table 1 above are equally applicable. Note that additional nodes may also be comprised in the communications system 100 in addition to the ones seen in FIG. 1.

A more detailed exemplary embodiment of a non-roaming architecture of the communications system 100 for 3GPP access will now be described with reference to FIG. 2. The exemplary embodiment in FIG. 2 is a more detailed version of the communications system 100 seen in FIG. 1.

FIG. 2 shows an E-UTRAN 201. The E-UTRAN 201 comprises elements such as a RAN node (not shown in FIG. 2). The RAN node may be for example a base station, e.g. such as a NodeB, an evolved NodeB (eNode B, eNB) or similar, or it may be a Radio Network Controller (RNC) that controls a number of base stations or similar or any other element capable to communicate with a UE 101. The reference point between the UE 101 and the E-UTRAN 101 may be referred to as LTE-Uu.

An MME 208 may be connected to the E-UTRAN 201 via the reference point S1-MME. The MME 208 is an element having functions such as e.g. Non-Access Stratum (NAS) signalling, inter CN node signalling for mobility between 3GPP access networks, UE reachability, Tracking Area (TA) list management, PGW and SGW selection, MME selection for handover with MME change etc. S10 is the reference point between MMEs 208 for MME relocation and MME to MME information transfer. The MME 208 is an example of the mobility management node 108 shown in FIG. 1.

Two gateway nodes 110 are seen in FIG. 2, i.e. the SGW 210 and the PGW 215. The SGW 210 and the PGW 215 may be implemented in one physical node or in separate physical nodes. The SGW 210 is the gateway which terminates the interface towards E-UTRAN 201. The reference point between the SGW 210 and the E-UTRAN 201 for the per bearer user plane tunneling and inter eNodeB path switching during handover may be referred to as S1-U. The SGW 210 routes and forwards user data packets, while also acting as the mobility anchor for the user plane during inter-eNodeB handovers and as the anchor for mobility between LTE and other 3GPP technologies (relaying the traffic between Second Generation/Third Generation (2G/3G) systems and the PGW 215) etc. S11 is the reference point between the SGW 210 and the MME 208.

The PGW 215 is the gateway which terminates the SGi interface towards the Packet Data Network (PDN). The PDN is illustrated in FIG. 2 by the Operator's IP Services (e.g. IMS, PSS etc.) 218. IP is short for Internet Protocol and PSS is short for Packet Switched Streaming. If the UE 101 is accessing multiple PDNs, there may be more than one PGW 215 for that UE 101. Functions of the PGW 215 are e.g. providing connectivity from the UE 101 to external PDNs by being the point of exit and entry of traffic for the UE 101, performing policy enforcement, packet filtering for each user, charging support, lawful interception and packet screening etc. S5 is the reference point which provides user plane tunnelling and tunnel management between the SGW 210 and the PGW 215.

The SGSN 220 is responsible for the delivery of data packets from and to the UE's 101 within its geographical service area. One of the SGSN's 220 functions is to provide signaling for mobility between 2G/3G and E-UTRAN 101 3GPP access networks. 2G/3G access network are exemplified with GERAN 222 and UTRAN 225 in FIG. 2. Some further functions of the SGSN 220 are to handle packet routing and transfer, mobility management (attach/detach and location management), logical link management, and authentication and charging functions etc. S3 is the interface between the SGSN 220 and the MME 208. S4 is a reference point between the SGSN 220 and the SGW 210. S12 is the reference point between the SGW 210 and the UTRAN 225. In some embodiments, the SGSN 220 and the MME 208 are co-located in one node. In this text, the term MME/SGSN will refer to any one of a standalone MME 208 or a standalone SGSN 220 or a combined MME 208 and SGSN 220 node. The SGSN 220 may be an example of the mobility management node 108 in FIG. 1.

The HSS 228 is a subscriber server node similar to the GSM HLR and Authentication Centre (AuC). The HSS 228 comprises subscriber-related information (subscriber profiles), performs authentication and authorization of the user, and may provide information about the subscriber's location and IP information. The reference point S6a enables transfer of subscription and authentication data for authenticating/authorizing user access to the evolved system between the MME 208 and the HSS 228. Note that the HSS 228 is only shown as an example in FIG. 2 and that any type of subscriber database may be used instead of the HSS 228, such as e.g. a HLR etc. The HSS 228 is an example of the subscriber database 128 in FIG. 1.

The PCRF 230 is a policy and charging control element. The PCRF 130 encompasses policy control decision and flow based charging control functionalities, it provides network control regarding the service data flow detection, gating, QoS and flow based charging etc. The PCRF 230 may be described as a functional entity which may be a standalone node or a function implemented in another node. The reference point Gx provides transfer of (QoS) policy and charging rules from the PCRF 230 to a Policy and Charging Enforcement Function (PCEF) in the PGW 215.

Rx is the reference point which resides between the PCRF 230 and the Operator's IP Services 218. The Rx reference point is used to exchange application level session information between the PCRF 230 and the Application Function (AF) (not shown).

In some embodiments, a communications system may be divided into a RAN and a CN. The RAN may be e.g. the E-UTRAN 201 and may comprise a RAN node such as e.g. the base station as described above. Using FIG. 1 as an example, the CN may comprise the mobility management node 108, the gateway node 110 and the subscriber database 128. Using the exemplary embodiment in FIG. 2, the CN may comprise for example the MME 208, the SGW 210, the PGW 215, the SGSN 220, the HSS 228 and the PCRF 230. The RAN and the CN may each comprises additional entities not shown in FIG. 1 or 2. The CN may be a PS core network or a CS core network.

It should be noted that the communication links or reference points or interfaces in the communications systems seen in FIGS. 1 and 2 may be of any suitable kind including either a wired or wireless link. The link may use any suitable protocol depending on type and level of layer (e.g. as indicated by the Open Systems Interconnection (OSI) model) as understood by the person skilled in the art.

When the UE 101 has suspended its PS service, e.g. when the UE 101 performs CSFB from E-UTRAN 201 to GERAN 222 which does not support Dual Transfer Mode (DTM), the UE 101 is unable to communicate with network entities in the PS core network. In this case it is not optimal for network entities such as e.g. the HSS 128 and the PCRF 130 to initiate updates for the UE 101 context or the active PDN connection to which in turn trigger signaling towards the UE 101 which deemed failed.

DTM mentioned above is applicable for a UE 101 that supports GPRS. DTM is a protocol based on the GSM standard that makes simultaneous transfer of CS voice and PS data over the same radio channel simpler. Without DTM, the UE 101 must be capable of reception and transmission simultaneously.

The embodiments herein provide a mechanism in mobility management nodes for the handling transmission of subscriber data when the UE 101 is not reachable, e.g. when the UE 101 gets into suspend state or in power saving mode. At least some of the subscriber data may be changed subscriber data.

Figure 3:
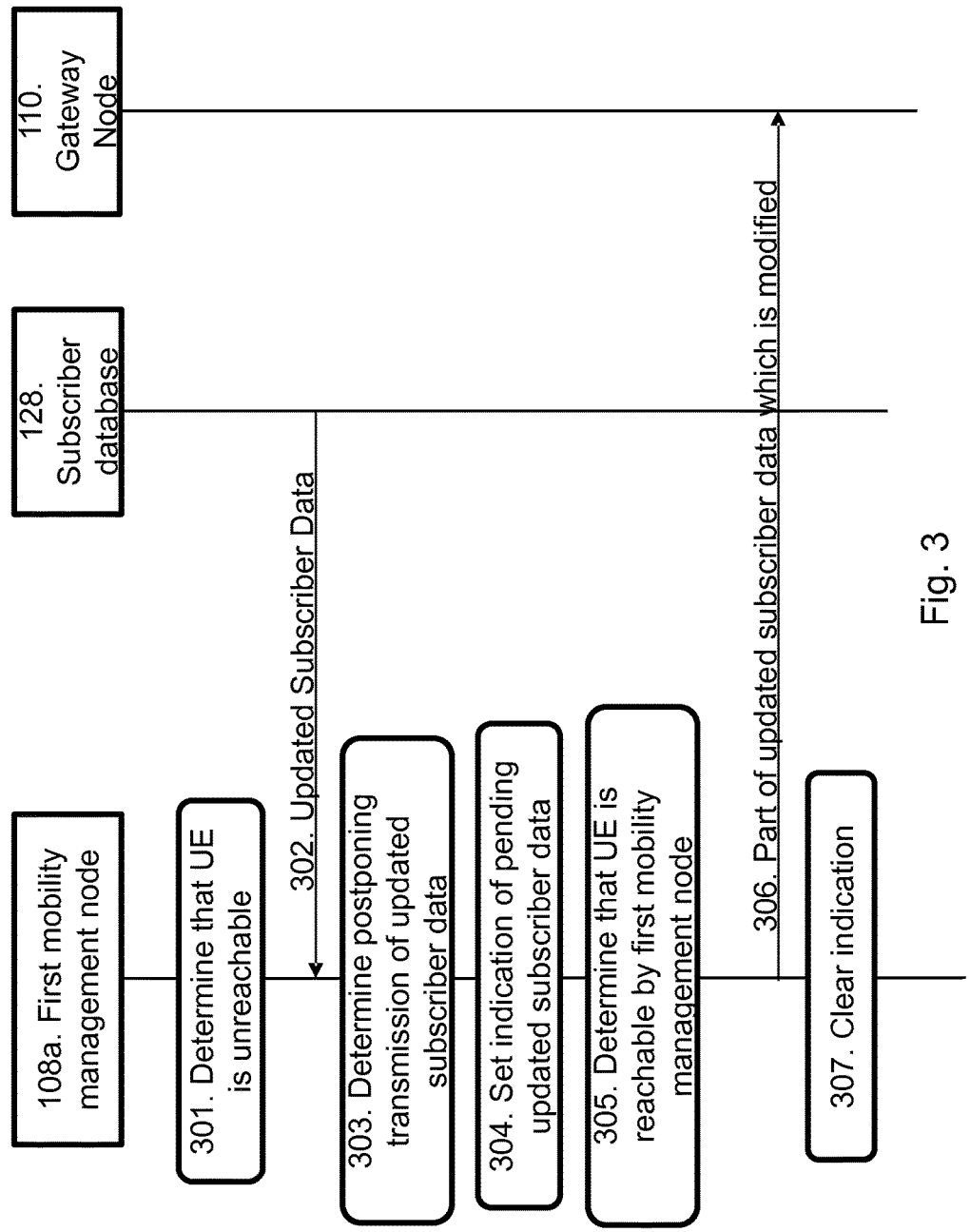
FIG. 3 is a signaling diagram illustrating embodiments of a method.

The method for handling updated subscriber data associated with the UE 101 according to some embodiments will now be described with reference to the signaling diagram depicted in FIG. 3 with reference to FIG. 1. FIG. 3 illustrates an embodiment where the UE 101 becomes, after a while, reachable by the first mobility management node 108*a*. Before the start of the method in FIG. 3, i.e. before step 301 is performed, the first mobility management node 108*a* has received subscriber data e.g. during initial attachment, from the subscriber database 128. This subscriber data may be referred to as QoS1. The UE 101 then runs payload transferring and suspends its PS service, i.e. it becomes unreachable. The method seen in FIG. 3 comprises the following steps, which steps may as well be carried out in another suitable order than described below:

Step 301

The first mobility management node 108*a* determines that the UE 101 is currently unreachable, i.e. that the first mobility management node 108*a* cannot reach the UE 101 at the moment. The term presently may be used interchangeably with the term currently. The first mobility management node 108*a* may determine the unreachability by e.g. detecting that signaling transmitted to the UE 101 has not been acknowledged back to the first management node 108*a*, that the UE 101 has not sent any periodic TAU message, or that the UE is suspended etc. In some embodiments, the first mobility management node 108*a* may store information about that the UE 101 is unreachable. There may be several reasons for that the UE 101 is unreachable by the first mobility management node 108. One reason may be that the UE 101 is in suspend state. Other reasons may be that the UE 101 has activated power saving mode, or that the UE 101 is out of radio coverage for a certain period of time from the first mobility management node 108*a* which may result in that a PPF associated with the UE 101 is cleared in the first mobility management node 108*a* etc.

The PPF will now be described shortly. The UE 101 makes periodic TAU in idle mode. If the UE 101 does not make any TAU or RAU, the first mobility management node 108 may deduce that the UE 101 is unreachable. However, the first mobility management node 108*a* does not know for how long the UE 101 is unreachable, so the first mobility management node 108*a* shall not immediately delete the UE's bearers. Instead the first mobility management node 108*a* should clear the PPF flag in the first mobility management node 108*a* and start an Implicit Detach timer. So the PPF in cleared state may be described as some sort of waiting for detaching the UE 101, and during that time the UE 101 will not be paged.

Step 302

The subscriber database 128 sends updated subscriber data to the first mobility management node 108*a*, i.e. the mobility management node 108*a* receives, from the subscriber database 128, updated subscriber data associated with the UE 101. At least part of the updated subscriber data is modified. The updated subscriber data may be referred to as QoS2. The updated subscriber data QoS2 is updated compared to the subscriber data QoS1 which the first mobility management node 108*a* received before the start of the method in FIG. 3. The subscriber database 128 may e.g. send the updated subscriber data upon request, on a regular basis or when the data has been updated. In some embodiments, at least part of the updated subscriber data is modified subscriber data. The updated subscriber data may comprise e.g. International Mobile Subscriber Identity (IMSI) associated with the UE and Subscription Data. The updated subscription data may comprise e.g. EPS subscribed QoS (QCI, ARP) and the subscribed APN-AMBR. QCI is short for QoS Class Identifier, ARP is short for Allocation and Retention Priority and APN-AMBR is short for Access Point Name-Aggregate Maximum Bit Rate.

Step 303

Since the first mobility management node 108a determined in step 301 that the UE is unreachable, the first mobility management node 108a now determines that the transmission of the updated subscriber data to a gateway node 110 should be postponed. This may e.g. be determined by the first mobility management node 108a based on that the UE 101 is currently unreachable as determined in step 301, possibly also based on the reception in step 302 of updated subscriber data from the subscriber database 128. The transmission of the updated subscriber data to the gateway node 110 should be postponed until the UE 101 has become reachable, e.g. reachable by the first mobility management node 108a. In some embodiments, it may be transmission of the parts of the subscriber data that is modified that is postponed.

Step 304

In some embodiments, the first mobility management node 108a sets an indication indicating that there is updated subscriber data waiting to be transmitted to the gateway node 110, i.e. there is pending updated subscriber data to be transmitted to the gateway node 110. With the term pending it is meant that the updated subscriber data has been received by the first mobility management node 108, but that the data has not been further processed, i.e. it has not been further transmitted to the gateway node 110.

The indication may be e.g. in the form of a flag, an Information Element (IE) etc. More details regarding the indication will be described later.

Step 305

The first mobility management node 108a determines that the UE 101 has become reachable, i.e. reachable by the first mobility management node 108a. This may e.g. be determined by the first mobility management node 108a in that the first mobility management node 108a pages the UE 101 and receives an answer from the UE 101, or in that the first mobility management node 108a notices that the UE 101 sends a TAU request, a RAU request or similar, or in that the UE 101 sends a service request or similar.

Step 306

The first mobility management node 108a sends at least the part of the of the pending updated subscriber data which is modified to the gateway node 110. For example, if the parameters QCI, the ARP and the subscribed APN-AMBR have been modified, at least one of these parameters are sent to the gateway node 110 in step 306. The modified part of the subscriber data sent to the gateway node 110 in step 306 may be described as Δ=QoS1−QoS2. In addition, parts of the updated subscriber data which has not been modified may also be transmitted to the gateway node 110 in step 306. Note that this step 306 is only performed when the UE 101 has become reachable by the first mobility management node 108a. An embodiment where the UE 101 has become reachable by the second mobility management node 108b will be described below with reference to FIG. 4.

Step 307

When the at least the modified part of the updated subscriber data has been sent to the gateway node 110, the first mobility management node 108a may clear the indication that was set in step 304, e.g. a flag or similar may be cleared.

Figure 4:
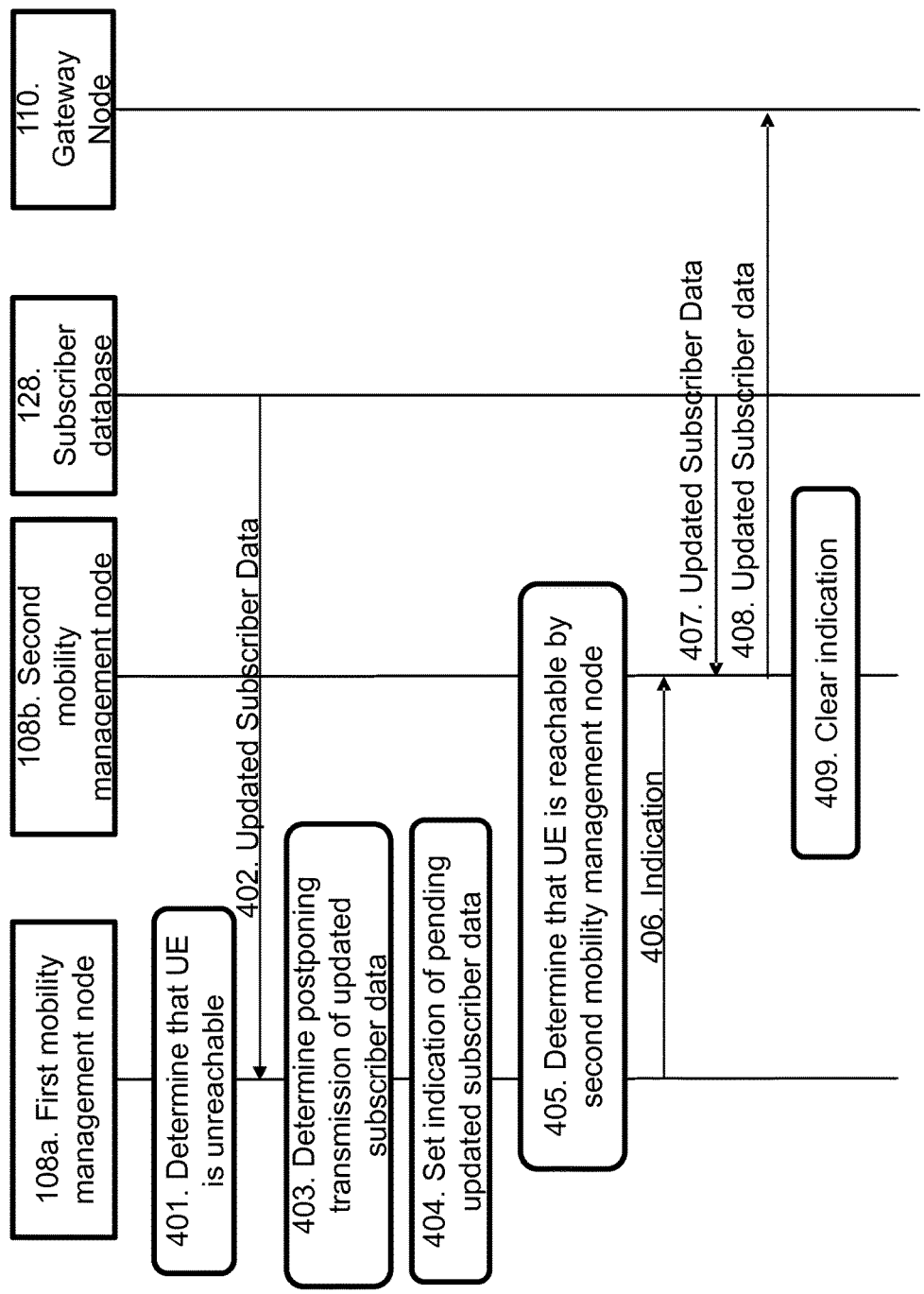
FIG. 4 is a signaling diagram illustrating embodiments of a method.

The method for handling updated subscriber data associated with the UE 101 according to some embodiments will now be described with reference to the signaling diagram depicted in FIG. 4 with reference to FIG. 1. FIG. 4 illustrates an embodiment where the UE 101 becomes, after a while, reachable by the second mobility management node 108b. This is different compared to the signaling diagram in FIG. 3 which illustrates an embodiment where the UE 101 becomes reachable by the first mobility management node 108a. Before the start of the method in FIG. 4, i.e. before step 401 is performed, the first mobility management node 108a has received subscriber data e.g. during initial attachment, from the subscriber database 128. This subscriber data may be referred to as QoS1. The method seen in FIG. 4 comprises the following steps, which steps may as well be carried out in another suitable order than described below:

Step 401

This step corresponds to step 301 in FIG. 3. The first mobility management node 108a determines that the UE 101 is currently unreachable, i.e. that the first mobility management node 108a cannot reach the UE 101 at the moment. The first mobility management node 108a may determine this by e.g. detecting that signaling transmitted to the UE 101 has not been acknowledged back to the first management node 108a. In some embodiments, the first mobility management node 108a may store information about that the UE 101 is unreachable. There may be several reasons for that the UE 101 is unreachable by the first mobility management node 108. One reason may be that the UE 101 is in suspend state. Other reasons may be that the UE 101 is out of radio coverage from the first mobility management node 108a, that the UE 101 has activated power saving mode, or that a PPF associated with the UE 101 is cleared in the first mobility management node 108a, etc.

Step 402

This step corresponds to step 302 in FIG. 3. The subscriber database 128 sends updated subscriber data to the first mobility management node 108a, i.e. the first mobility management node 108a receives, from the subscriber database 128, updated subscriber data associated with the UE 101. At least part of the updated subscriber data is modified. The updated subscriber data may be referred to as QoS2. The updated subscriber data is updated compared to the subscriber data QoS1 received before the start of the method in FIG. 4. The subscriber database 128 may e.g. send the updated subscriber data upon request, on a regular basis or when the data has been updated. In some embodiments, at least part of the updated subscriber data is subscriber data is modified. The updated subscriber data may comprise e.g. IMSI associated with the UE and Subscription Data. The subscription data may comprise e.g. EPS subscribed QoS (QCI, ARP) and the subscribed APN-AMBR.

Step 403

This step corresponds to step 303 in FIG. 3. Since the first mobility management node 108a determined in step 401 that the UE is unreachable, the first mobility management node 108a now determines that the transmission of the updated subscriber data to a gateway node 110 should be postponed. This may e.g. be determined by the first mobility management node 108a based on that the UE 101 is currently unreachable as determined in step 401, possibly also based on the reception in step 402 of updated subscriber data from the subscriber database 128. The transmission of the updated subscriber data to the gateway node 110 should be postponed until the UE 101 has become reachable, e.g. reachable by the second mobility management node 108b.

Step 404

This step corresponds to step 304 in FIG. 3. In some embodiments, the first mobility management node 108a sets an indication indicating that there is updated subscriber data waiting to be transmitted to the gateway node 110, i.e. that there are pending updated subscriber data to be transmitted. With the term pending it is meant that the updated subscriber data has been received by the first mobility management node 108, but that the data has not been transmitted to the gateway node 110.

The indication may be e.g. in the form of a flag, an IE etc. More details regarding the indication will be described later.

Step 405

At least one of the first mobility management node 108a and the second mobility management node 108a determines that the UE 101 has become reachable, i.e. reachable by the second mobility management node 108b. This may e.g. be determined by the mobility management node 108a, 408b in that the mobility management node 108a, 108b pages the UE 101 and receives an answer from the UE 101, or in that the mobility management node 108a, 108b notices that the UE 101 send a TAU request, a RAU request or similar, or in that the UE 101 sends a service request or similar. Step 405 is drawn as a box covering both the first mobility management node 108a and the second mobility management node 108b in order to indicate that both nodes may determine that the UE 101 has become reachable. Embodiments of this step will be described in more detail with reference to steps 605 and 606 in FIG. 6.

Step 406

The first mobility management node 108a sends, to the second mobility management node 108b, information about that there is pending updated subscriber data waiting to be transmitted to the gateway. Such transmitted information may be in the form of the indication set in step 404.

In some embodiments, the information sent to the second mobility node 108b may be cleared in the first mobility management node 108a after the information has been sent to the second mobility management node 108b.

Step 407

The second mobility management node 108b receives pending updated subscriber data from the subscriber database 128. This updated subscriber data may be referred to as QoS2. In some embodiments, this step 407 is triggered by the second mobility management node 108b sending a request for such updated subscriber data to the subscriber database 128, which will be described in more detail with reference to steps 610 and 611 in FIG. 6 below. The updated subscriber data sent to the second mobility management node 108b may be the same data which was sent to the first mobility management node 108a in step 402.

Step 408

The second mobility management node 108b sends at least part of the pending updated subscriber data to the gateway node 110. The updated subscriber data sent to the gateway node is the QoS2. For example, at least one of the parameters QCI, the ARP and the subscribed APN-AMBR may be the at least part of the pending updated subscriber data that is sent to the gateway node 110. In some embodiments, at least part of the updated subscriber data sent to the gateway node 110 is modified, e.g. the QCI, the ARP and the subscribed APN-AMBR may be modified. Note that this may be different from the embodiment illustrated in FIG. 3, where only the modified part of the updated subscriber data is sent to the gateway node 110 (not necessarily all pending updated subscriber data. In this step 408 the at least part of the pending updated subscriber data sent to the gateway node 110 is not necessarily modified, but it might be modified.

Step 409

When at least part of the updated subscriber data has been sent to the gateway node 110, the second mobility management node 108b may clear the indication that was set in step 404, i.e. a flag may be cleared.

Figure 5:
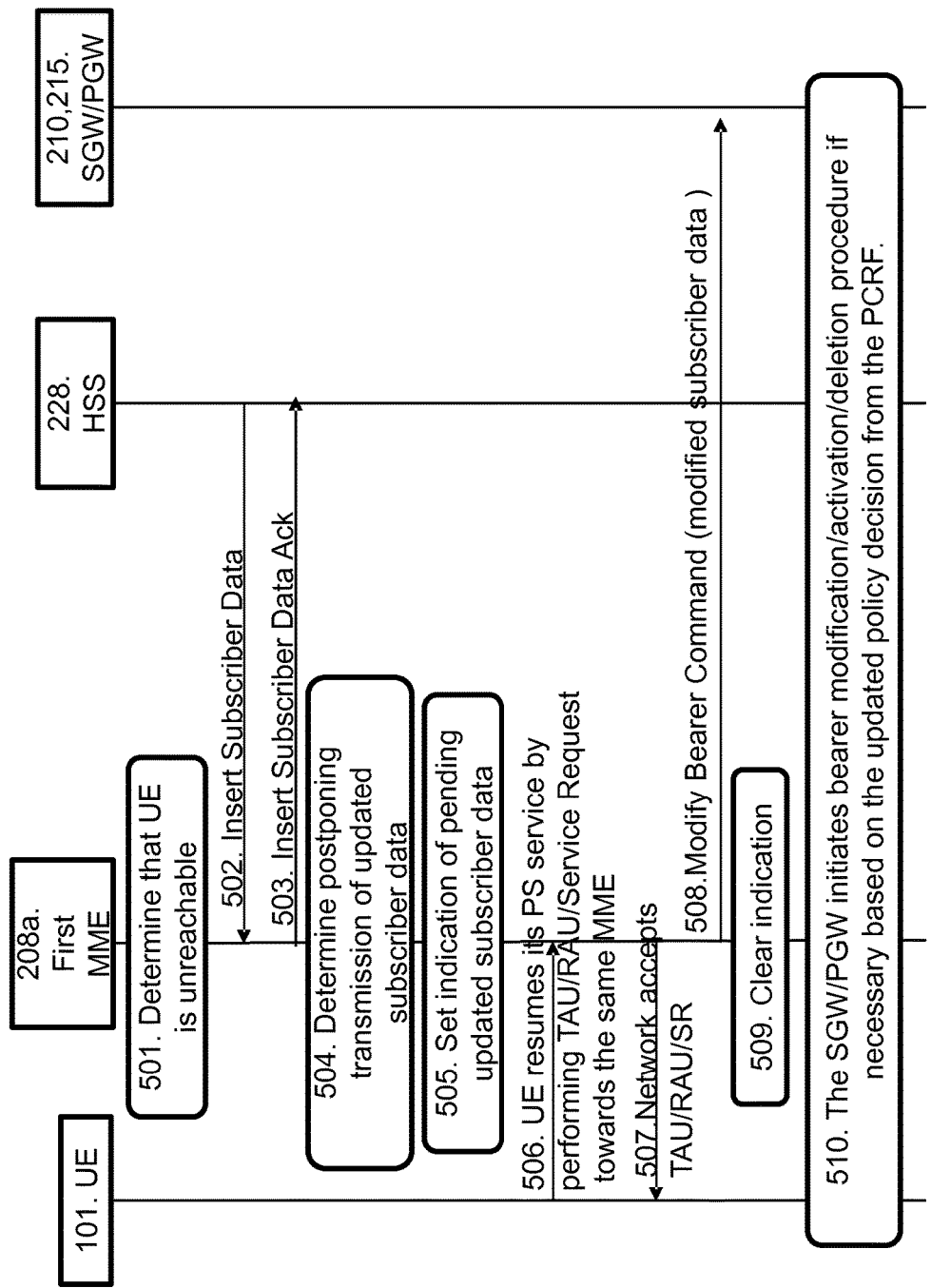
FIG. 5 is a signaling diagram illustrating embodiments of a method.
Figure 6:
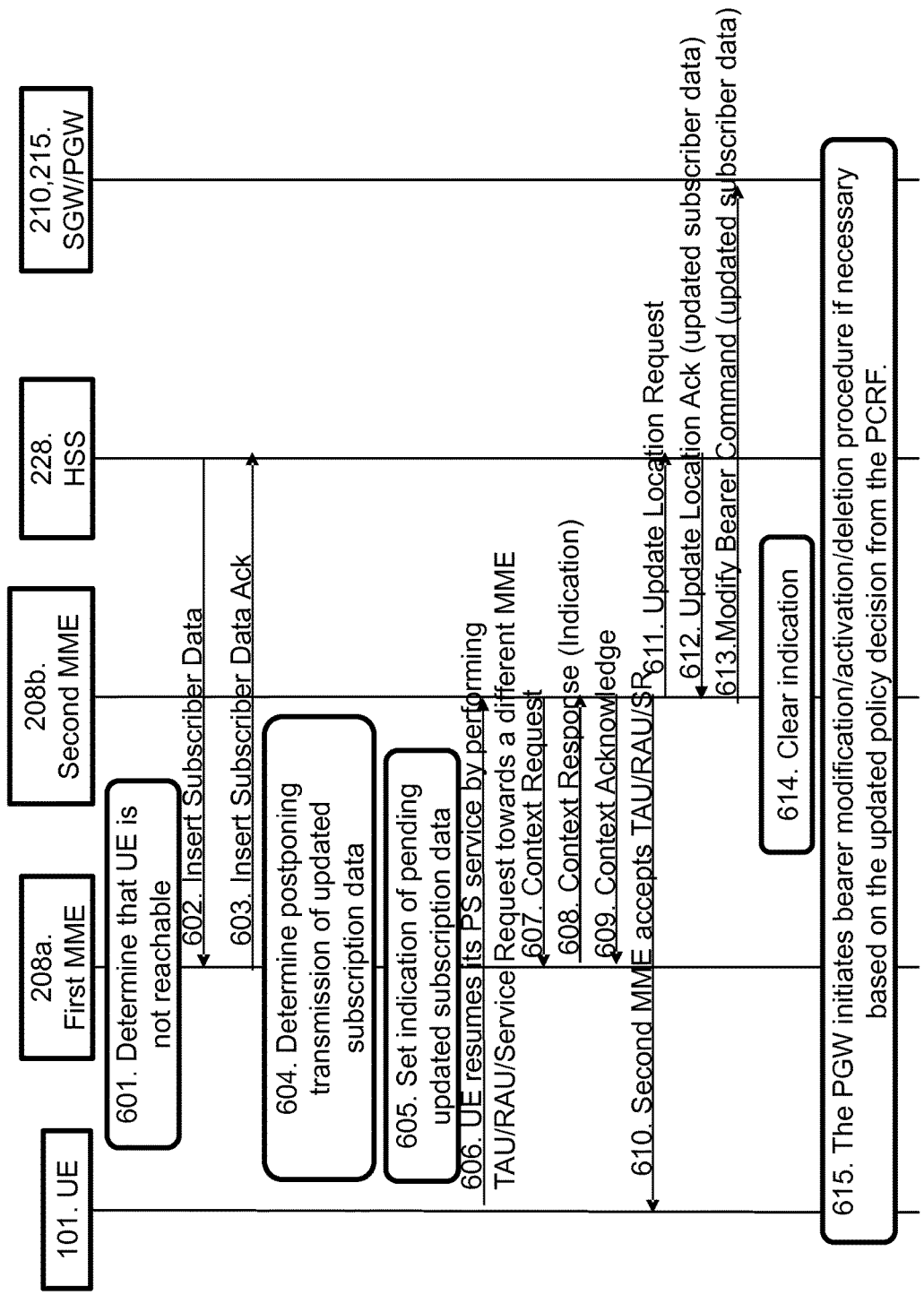
FIG. 6 is a signaling diagram illustrating embodiments of a method.

The method described above will now be described with reference to FIGS. 5 and 6. The embodiments of the method in FIGS. 5 and 6 are more detailed compared to the method illustrated in FIGS. 3 and 4. I FIGS. 5 and 6, the mobility management nodes are exemplified by an MME 208. However, the mobility management node may also be a SGSN or a combined MME and SGSN node. Furthermore, the subscriber database 182 is illustrated by a HSS 228 and the gateway node 110 is illustrated by a combined SGW and PGW node 210, 215. FIG. 5 refers to the case when the UE 101 returns to the same MME 208a, while FIG. 6 refers to the case when the UE 101 returns to a different MME 208b. The embodiments shown in FIGS. 5 and 6 are based on a signaling procedure specified in the chapter 5.3.9 ("HSS User Profile management function procedure") and 5.4.4.2 ("HSS Initiated Subscribed QoS Modification") of 3GPP TS 23.401, version 12.5.0.

FIG. 5 illustrates embodiments of a method which may be described as an HSS 228 Initiated Subscribed QoS Modification for a non-reachable UE 101. FIG. 5 illustrates the same case as FIG. 3, i.e. where the UE 101 becomes, after a while, reachable by the first MME 208a. Before start of the method in FIG. 5, the UE 101 has a PS service towards the first MME 208a. The method comprises the following steps, which steps may be performed in any suitable order than described below:

Step 501

This step corresponds to step 301 in FIG. 3 and step 401 in FIG. 4. The first MME 208a determines that the UE 101 is currently unreachable, i.e. that the first the first MME 208a cannot reach the UE 101. The first MME 208a may determine the unreachability by e.g. detecting that signaling transmitted to the UE 101 has not been acknowledged back to the first MME 208a, that the UE 101 has not sent any periodic TAU or RAU message, or that the UE 101 is suspended etc. In some embodiments, the first MME 208a may store information about that the UE 101 is unreachable. There may be several reasons for that the UE 101 is unreachable by the first MME 208a. One reason may be that the UE 101 is in suspend state. Other reasons may be that the UE 101 is out of radio coverage from the first MME 208a, that the UE 101 has activated power saving mode, or that a PPF associated with the UE 101 is cleared in the first MME 208a etc.

Step 502

This step corresponds to step 302 in FIG. 3 and step 402 in FIG. 4. The HSS 228 sends an insert subscriber data message to the first MME 208a, i.e. the first MME 208a receives, from the HSS 228, updated subscriber data associated with the UE 101. At least part of the updated subscriber data may be modified. The message comprises updated subscriber data associated with the UE 101 such as e.g. IMSI and subscription Data. The subscription data may comprise e.g. EPS subscribed QoS (QCI, ARP) and the subscribed APN-AMBR. The message indicates that the updated subscriber data should be inserted in the first MME 208a. As a result, the first MME 208a stores the received updated subscriber data such that the first MME 208 comprises updated subscriber data. In some embodiments, at least part of the subscriber data may be modified subscriber data.

Step 503

In some embodiments, the first MME 208a sends an Insert Subscriber Data Ack message to the HSS 228. The abbreviation Ack is short for Acknowledgement. The Insert Subscriber Data Ack message may comprise the IMSI associated with the UE 101 and the result of the insertion of the updated subscriber data in step 502, i.e. whether or not it was successful.

Steps 502 and 503 may be seen as being part of a HSS User Profile management function procedure.

Step 504

This step corresponds to step 303 in FIG. 3 and step 403 in FIG. 4. Since the first MME 208a determined in step 501 that the UE is unreachable, the first MME 208a now determines that the transmission of the updated subscriber data to the SGW/PGW 210, 215 should be postponed. This may e.g. be determined by the first MME 208a based on that the UE 101 is currently unreachable as determined in step 501, possibly also based on the reception in step 502 of updated subscriber data from the HSS 228. The transmission of the updated subscriber data to the SGW/PGW 210, 215 should be postponed until the UE 101 has become reachable, e.g. reachable by the first MME 208a.

Step 505

This step corresponds to step 304 in FIG. 3 and step 404 in FIG. 4. In some embodiments, the first MME 208a sets an indication indicating that there is pending updated subscriber data waiting to be transmitted to the SGW/PGW 210,215. With the term pending it is meant that the data has been received by the first MME 208, but that the data has not been further processed, i.e. it has not been further transmitted to the SGW/PGW 210, 215. In other words, the first MME 208a sets information indicating that there is a HSS initiated pending updated subscriber data transmission, to be executed when the UE 101 becomes reachable.

The indication may be e.g. in the form of a flag, a condition, an IE etc. More details regarding the indication will be described later.

Step 506

The UE 101 resumes its PS service by sending a TAU request or a RAU request or a Service Request to the same MME 208 that it was served by before the UE 101 became unreachable, i.e. the first MME 208a. With this, UE 101 has become reachable by the first MME 208a.

Step 507

The network, i.e. the first MME 208a accepts the TAU request or the RAU request or the Service Request from step 505 and sends information about this to the UE 101.

Steps 506 and 507 together may be seen as an example embodiment of step 305 in FIG. 3.

Step 508

This step corresponds to step 306 in FIG. 3. The first MME 208a sends a Modify Bearer Command to the SGW/PGW 210, 215. The Modify Bearer Command comprises at least part of the pending updated subscriber data which is modified.

Step 509

This step corresponds to step 307 in FIG. 3. In some embodiments, the first MME 208a clears the indication set in step 505 after at least the modified part of the pending updated subscriber data has been sent to the SGW/PGW 210, 215 in step 508.

Step 510

The SGW/PGW 210, 215 may initiate a bearer modification/activation/deletion procedure if necessary based on the updated policy decision from the PCRF 230 (the PCRF 230 is not shown in FIG. 5).

In steps 506-510 the UE 101 becomes reachable and the pending initiated Subscriber data transmission is executed as specified in 5.4.2.2 HSS Initiated Subscribed QoS Modification in 3GPP TS 23.401.

FIG. 6 illustrates embodiments of a method which may be described as an HSS 228 Initiated Subscribed QoS Modification for a non-reachable UE 101. FIG. 6 illustrates the same case as FIG. 4, i.e. where the UE 101 becomes, after a while, reachable by the second MME 208b. Before start of the method in FIG. 6, the UE 101 has a PS service towards the first MME 208a. The method comprises the following steps, which steps may be performed in any suitable order than described below:

Step 601

This step corresponds to step 301 in FIG. 3, step 401 in FIG. 4 and step 501 in FIG. 5. The first MME 208a determines that the UE 101 is currently unreachable, i.e. that the first the first MME 208a cannot reach the UE 101. The first MME 208a may determine this by detecting that signaling transmitted to the UE 101 has not been acknowledged back to the first MME 208a, that the UE 101 has not sent any periodic TAU or RAU message, or that the UE 101 is suspended etc. In some embodiments, the first MME 208a may store information about that the UE 101 is unreachable. There may be several reasons for that the UE 101 is unreachable by the first MME 208a. One reason may be that the UE 101 is in suspend state. Other reasons may be that the UE 101 is out of radio coverage from the first MME 208a, that the UE 101 has activated power saving mode, or that a PPF associated with the UE 101 is cleared in the first MME 208a etc.

Step 602

This step corresponds to step 302 in FIG. 3, step 402 in FIG. 4 and step 502 in FIG. 5. The HSS 228 sends an insert subscriber data message to the first MME 208a, i.e. the first MME 208a receives, from the HSS 228, updated subscriber data associated with the UE 101. At least part of the updated subscriber data is modified. Thus, the message comprises updated subscriber data associated with the UE 101 such as e.g. IMSI and other types of Subscriber Data. The message indicates that the updated subscriber data should be inserted in the first MME 208a. As a result, the first MME 208a stores the received updated subscriber data such that the first MME 208 comprises updated subscriber data. In some embodiments, at least part of the subscriber data is modified subscriber data.

Step 603

This step corresponds to step 503 in FIG. 5. In some embodiments, the first MME 208a sends an Insert Subscriber Data Ack message to the HSS 228. The Insert Subscriber Data Ack message may comprise the IMSI associated with the UE 101 and the result of the insertion of the updated subscriber data.

Steps 602 and 603 may be seen as being part of a HSS User Profile management function procedure.

Step 604

This step corresponds to step 303 in FIG. 3, step 403 in FIG. 4 and step 504 in FIG. 5. Since the first MME 208a determined in step 601 that the UE is unreachable, the first MME 208a now determines that the transmission of the updated subscriber data to the SGW/PGW 210, 215 should be postponed. This may e.g. be determined by the first MME 208a based on that the UE 101 is currently unreachable as determined in step 601, possibly also based on the reception in step 602 of updated subscriber data from the HSS 228. The transmission of the updated subscriber data to the SGW/PGW 210, 215 should be postponed until the UE 101 has become reachable, e.g. reachable by the first MME 208a.

Step 605

This step corresponds to step 304 in FIG. 3, step 404 in FIG. 4 and step 505 in FIG. 5. In some embodiments, the first MME 208a sets an indication indicating that there is pending updated subscriber data waiting to be transmitted to the SGW/PGW 210,215. With the term pending it is meant that the data has been received by the first MME 208, but that the data has not been further processed, i.e. it has not been further transmitted to the SGW/PGW 210, 215. In other words, the first MME 208a sets information indicating that there is a HSS initiated Subscriber data transmission that is pending, to be executed when the UE 101 becomes reachable.

The indication may be e.g. in the form of a flag, an IE etc. More details regarding the indication will be described later.

Step 606

The UE 101 resumes its PS service by sending a TAU request or a RAU request or a Service Request to a different MME 208 compared to the MME 208 which the UE 101 was served by before the UE 101 became unreachable. Such different MME 208 is the second MME 208b. With this, UE 101 has become reachable by the second MME 208b. This is an example embodiment of how the second MME 208b determines that the UE 101 is reachable by the 25 second MME 208b as described in general terms in step 404, FIG. 4 above.

Step 607

The second MME 208b sends a Context Request message to the first MME 208a, i.e. the new MME requests the UE context from the old MME. With such Context Request message, the first MME 208a receives information about that the UE 101 has become reachable by the second MME 208b. In other words, this step is an example embodiment of how the first MME 208a determines that the UE 101 is reachable by the second MME 208b as described in general terms in step 405, FIG. 4 above.

Thus, steps 606 and 607 may be seen as an example embodiment of step 405 in FIG. 4.

Step 608

The first MME 208a sends a Context Response message to the second MME 208b. The Context Response message is a response to the Context Request message in step 607. The Context Response message comprises information indicating that there is pending updated subscriber data waiting to be transmitted to the SGW/PGW 210,215. Such information may be in the form of the indication described in step 605. The indication may be a flag referred to as a "Pending Subscriber Change Notification Indication".

Step 609

The second MME 208b may send a Context Acknowledgement message to the first MME 208a.

Step 610

The network, i.e. the second MME 208b accepts the TAU request or the RAU request or the Service Request from step 606 and may send information about this to the UE 101.

Step 611

This step corresponds to step 407 in FIG. 4. The second MME 208a sends an Update Location Request message to the HSS 228. The Update Location Request message comprises a request for pending updated subscriber data associated with the UE 101.

Step 612

The HSS 228 sends an Update Location Ack message to the second MME 208a. The Update Location Ack message may be an acknowledgement of the Update Location Request message in step 610 acknowledging the receipt of the request message. The Update Location Ack message may comprise the pending updated subscriber data such as e.g. IMSI, Subscription Data etc. The Update Location Ack message is sent by the HSS 228 after it has cancelled the entire first MME context. At least some of the data in the updated subscriber data may be modified.

Step 613

This step corresponds to step 408 in FIG. 4. The second MME 208a sends a Modify Bearer Command message to the SGW/PGW 210, 215. The message comprises at least part of the pending updated subscriber data. In some embodiments, at least part of the pending updated subscriber data sent to the SGW/PGW 210,215 may be modified subscriber data.

Step 614

This step corresponds to step 409 in FIG. 4. In some embodiments, the second MME 208b clears the indication after the pending updated subscriber data has been sent to the SGW/PGW 210, 215.

Step 615

The SGW/PGW 210, 215 may initiate a bearer modification/activation/deletion procedure if necessary based on the updated policy decision from the PCRF 230 (the PCRF 230 is not shown in FIG. 6).

In steps 611-614, the pending initiated Subscriber data transmission pending is executed by the new MME as specified in 5.4.2.2 HSS Initiated Subscribed QoS Modification in 3GPP TS 23.401, version 12.5.0.

Indication

The indication which indicates the pending subscriber data illustrated in step 304 in FIG. 3, step 404 in FIG. 4, step 505 in FIG. 5 and step 605 in FIG. 6 will now be described in more detail.

In some embodiments, a flag may be for example called "Pending Subscription Change Notification Indication" for the UE context or the PDN connection. In some embodiments, a dedicated flag may be set by the first mobility management node 108a (e.g. a serving MME/SGSN) and may be set when the first mobility management node 108a receives a subscriber database initiated subscriber change. In some embodiments, the first mobility management node 108a reuses the existing flag Subscribed QoS Change Indication (SQCI) with the modification of semantics of the flag (which is in connection with an Idle mode Signalling Reduction (ISR) functionality).

The flag "Pending Subscription Change Notification Indication" may be transmitted over the S3/S10/S16 in a message such as the Context Response message or similar at the UE level or per PDN connection level. This flag has the purpose of indicating to that there is a pending subscriber change which has not been forwarded to the gateway node 110, e.g. the PGW so that the mobility management node 108 shall send a Modify Bearer Command with the subscribed QoS received from the subscriber database 129, or reuse the existing SQCI flag with the modification of semantics of the flag (which is in connection with ISR functionality).

Figure 7:
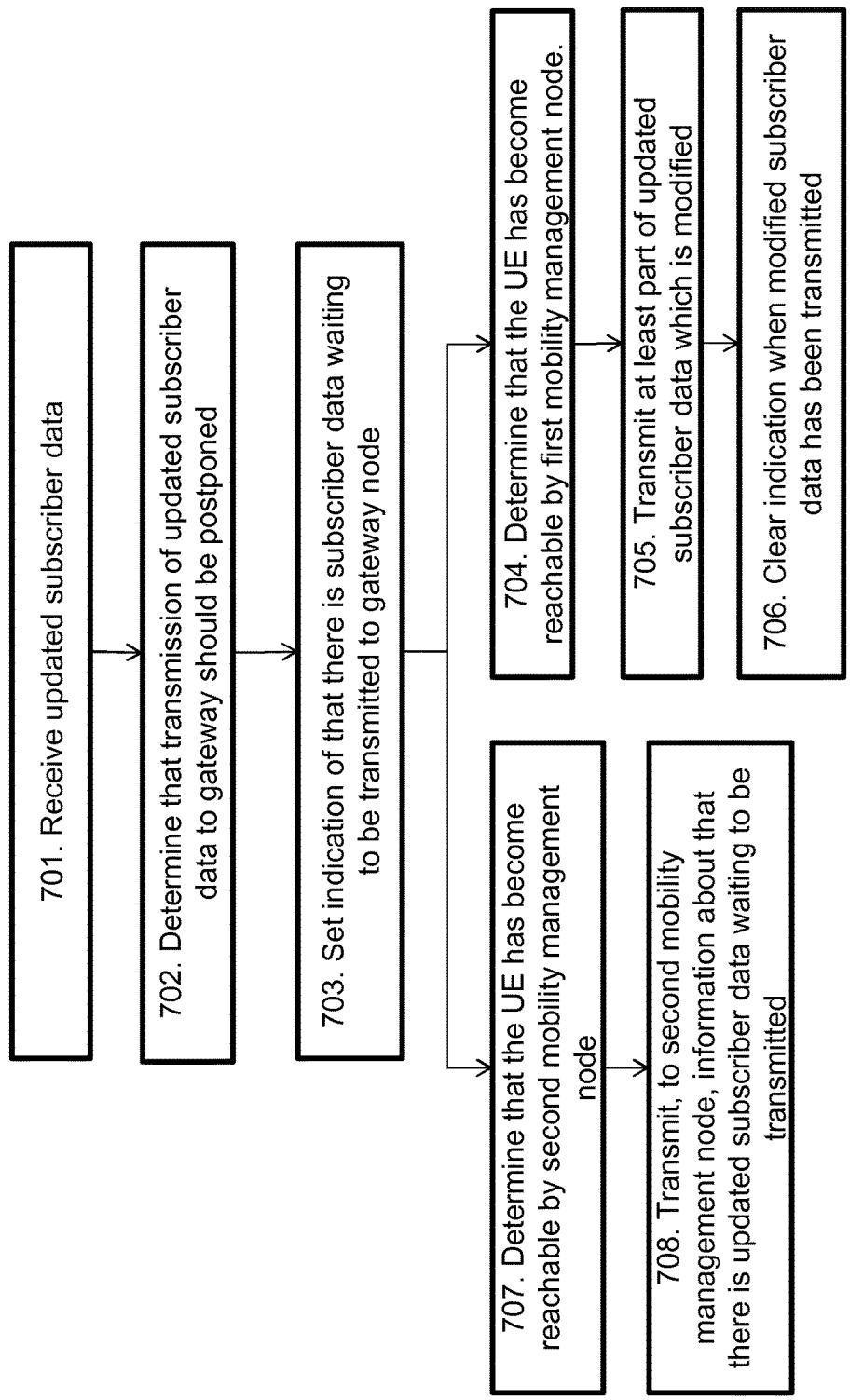
FIG. 7 is a flow chart illustrating embodiments of a method in a first mobility management node.

The method described above will now be described seen from the perspective of the first mobility management node 108a. FIG. 7 is a flowchart describing the present method in the first mobility management node 108a for handling updated subscriber data associated with the UE 101. The UE is currently unreachable by the first mobility management node 108 before step 701. In some embodiments, the UE 101 is unreachable when the UE 101 is in suspend state or in power saving state or when a PPF associated with the UE 101 is cleared in the first mobility management node 108a. The first mobility management node 108a may be a MME or a SGSN or a combined MME and SGSN node. The method comprises the following steps to be performed by the first mobility management node 108a, which steps may be performed in any suitable order than described below:

Step 701

This step corresponds to step 302 in FIG. 3, step 402 in FIG. 4, step 502 in FIG. 5 and step 602 in FIG. 6. The first mobility management node 108a receives, from a subscriber database 128, updated subscriber data associated with the UE 101. At least part of the updated subscriber data is modified. In some embodiments, the updated subscriber data comprises QoS parameters or similar as indicated above in connection with step 302. The subscriber database 128 may be a HSS or a HLR.

Step 702

This step corresponds to step 303 in FIG. 3, step 403 in FIG. 4, step 504 in FIG. 5 and step, 604 in FIG. 6. The first mobility management node 108a determines that transmission of the updated subscriber data to a gateway node 110 should be postponed until the UE 101 has become reachable. The gateway node 110 may be a SGW or a PGW or a combined SGW and PGW node.

Step 703

This step corresponds to step 304 in FIG. 3, step 404 in FIG. 4, step 505 in FIG. 5 and step 605 in FIG. 6. In some embodiments, the first mobility management node 108a sets an indication indicating that there is pending updated subscriber data waiting to be transmitted to the gateway node 110.

Step 704

This step corresponds to step 305 in FIG. 3 and step 506 in FIG. 5. In some embodiments, the first mobility management node 108a determines that the UE 101 has become reachable by the first mobility management node 108a.

Step 705

This step corresponds to step 306 in FIG. 3 and step 508 in FIG. 5. In some embodiments, the first mobility management node 108a transmits at least the part of the pending updated subscriber data which is modified to the gateway node 110.

Step 706

This step corresponds to step 307 in FIG. 3 and step 509 in FIG. 5. In some embodiments, the first mobility management node 108a clears the indication when the at least part of the updated subscriber data which is modified has been transmitted to the gateway node 110.

Step 707

This step corresponds to step 405 in FIG. 4. In some embodiments, the first mobility management node 108a determines that the UE 101 has become reachable by a second mobility management node 108b. The second mobility management node 108b may be a MME or a SGSN or a combined MME and SGSN node.

Step 708

This step corresponds to step 406 in FIG. 4 and step 608 in FIG. 6. The first mobility management node 108a transmits, to the second mobility node 108b, information about that there is pending updated subscriber data waiting to be transmitted to the gateway node 110. The information transmitted to the second mobility node 108b may be an indication indicating that there is updated subscriber data waiting to be transmitted to the gateway node 110.

Figure 8:
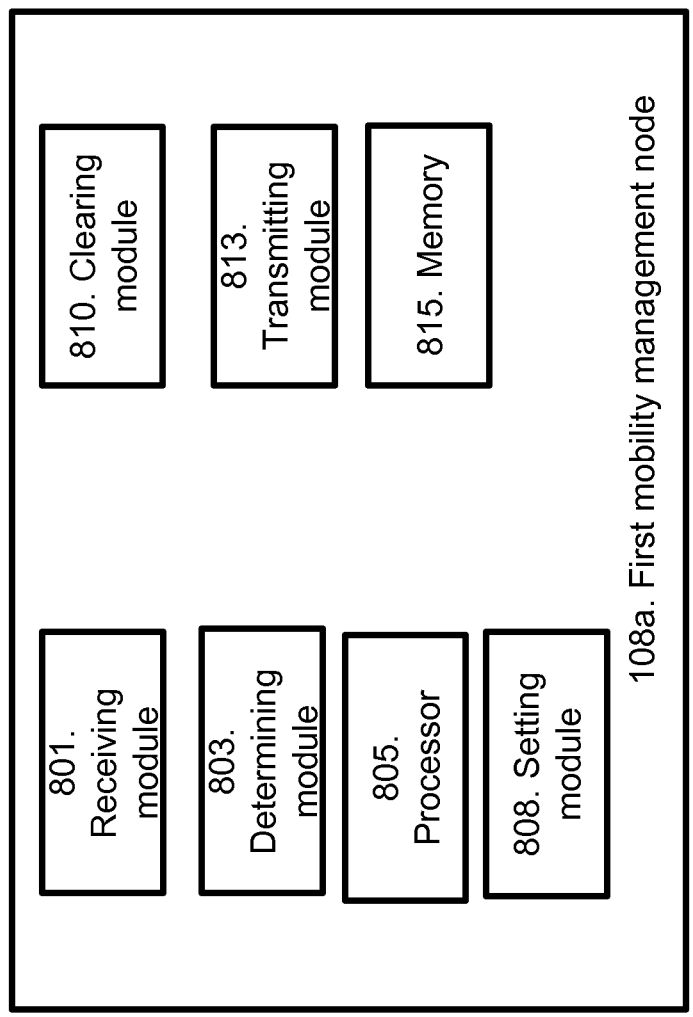
FIG. 8 is a schematic block diagram illustrating embodiments of the first mobility management node.

To perform the method steps shown in FIGS. 3, 4, 5, 6 and 7 for handling updated subscriber data associated with the UE 101, the first mobility management node 108a comprises an arrangement as shown in FIG. 8. As mentioned above, the UE 101 is currently unreachable by the first mobility management node 108a. In some embodiments, the UE 101 is unreachable when the UE 101 is in suspend state or in power saving state or when a PPF associated with the UE 101 has been cleared in the first mobility management node 108a. The first mobility management node 108a may be a MME or a SGSN or a combined MME and SGSN node.

The first mobility management node 108a is configured to, e.g. by means of a receiving module 801, receive, from a subscriber database 128, updated subscriber data associated with the UE 101. At least part of the updated subscriber data is modified. The receiving module 801 may also be referred to as a receiving circuit, receiving means, receiving unit, means for receiving or an input unit. The receiving module 801 may be a receiver, a transceiver etc. The receiving module 801 may be a wireless receiver of the first mobility management node 108a of a wireless or fixed communications system. The updated subscriber data may comprise QoS parameters. The subscriber database 128 may be a HSS or a HLR.

The first mobility management node 108a is further configured to, e.g. by means of a determining module 803, determine that transmission of the updated subscriber data to a gateway node 110 should be postponed until the UE 101 has become reachable. The determining module 803 may also be referred to as a determining circuit, determining means, determining unit, means for determining etc. The determining module 803 may be a processor 805 of the first mobility management node 108a. The gateway node 110 may be a SGW or a PGW or a combined SGW and PGW node.

The first mobility management node 108a may be further configured to, e.g. by means of a setting module 808, set an indication indicating that there is updated subscriber data waiting to be transmitted to the gateway node 110. The setting module 808 may also be referred to as a setting circuit, setting means, setting unit, means for setting etc. The setting module 808 may be the processor 805 of the first mobility management node 108a.

The first mobility management node 108a may be further configured to, e.g. by means of a clearing module 810, clear the indication when the at least part of the updated subscriber data which is modified has been transmitted to the gateway node 110. The clearing module 810 may also be referred to as a clearing circuit, clearing means, clearing unit, means for clearing etc. The clearing module 810 may be the processor 805 of the first mobility management node 108a.

In some embodiments, the first mobility management node 108a is further configured to, e.g. by means of the determining module 803, determine that the UE 101 has become reachable by the first mobility management node 108a.

In some embodiments, the first mobility management node 108a is further configured to, e.g. by means of a transmitting module 813, transmit at least the part of the updated subscriber data which is modified to the gateway node 110. The transmitting module 813 may also be referred to as a transmitting unit, a transmitting means, a transmitting circuit, means for transmitting or an output unit. The transmitting module 813 may be a transmitter, a transceiver etc. The transmitting module 813 may be a wireless transmitter of the first mobility management node 108*a* of a wireless or fixed communications system.

The first mobility management node 108*a* may be further configured to, e.g. by means of the determining module 803, determine, that the UE 101 has become reachable by a second mobility management node 108*b*.

The first mobility management node 108*a* may be further configured to, e.g. by means of the transmitting module 813, transmit, to the second mobility node 108*b*, information about that there is updated subscriber data waiting to be transmitted to the gateway node 110. The information transmitted to the second mobility node 108*b* may be an indication indicating that there is updated subscriber data waiting to be transmitted to the gateway node 110. The second mobility management node 108*b* may be a MME or a SGSN or a combined MME and SGSN node.

The first mobility management node 108*a* may further comprise a memory 815 comprising one or more memory units. The memory 815 is arranged to be used to store data, received data streams, power level measurements, updated subscriber data, modified subscriber data, request messages, response messages, indications, information about that the UE 101 is unreachable, threshold values, time periods, configurations, schedulings, and applications to perform the methods herein when being executed in the first mobility management node 108*a*.

Those skilled in the art will also appreciate that the receiving module 801, the determining module 803, the setting module 808, the clearing module 810 and the transmitting module 813 described above may refer to a combination of analog and digital circuits, and/or one or more processors configured with software and/or firmware, e.g. stored in a memory, that when executed by the one or more processors such as the processor 805 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A first computer program may comprise instructions which, when executed on at least one processor, cause the at least one processor to carry out the method as described in FIGS. 3-6 and 7. A first carrier may comprise the first computer program. The first carrier may be one of an electronic signal, optical signal, radio signal or computer readable storage medium.

Figure 9:
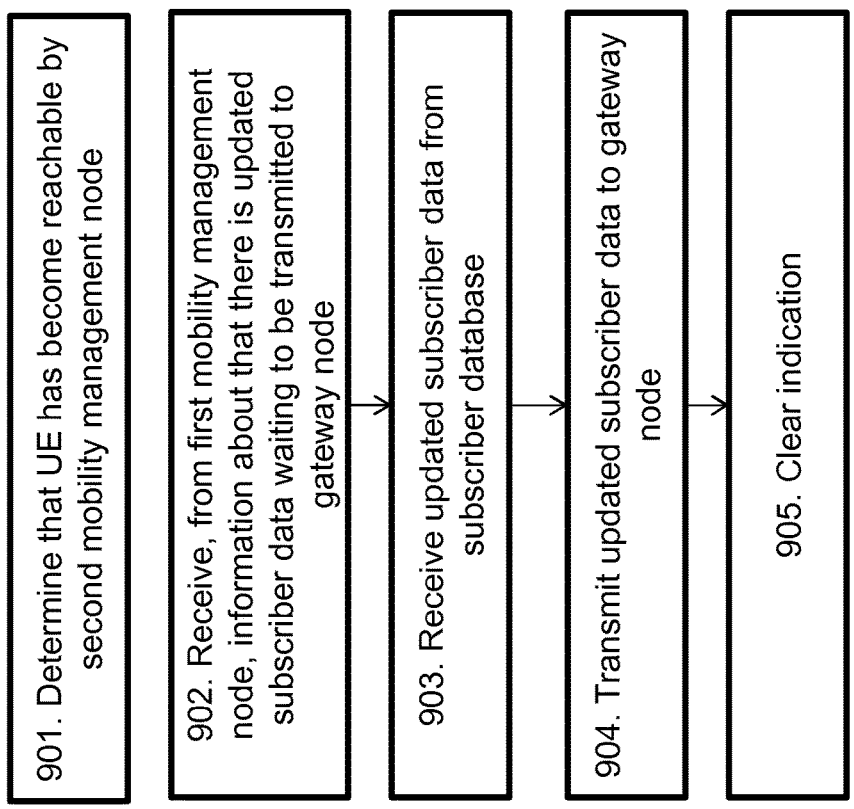
FIG. 9 is a flow chart illustrating embodiments of a method in a second mobility management node.

The method described above will now be described seen from the perspective of the second mobility management node 108*b*. FIG. 9 is a flowchart describing the present method in the second mobility management node 108*b* for handling updated subscriber data associated with the UE 101. The method comprises the further steps to be performed by the second mobility management node 108*b*, which steps may be performed in any suitable order than described below:

Step 901

This step corresponds to step 405 in FIG. 4 and step 606 in FIG. 6. The second mobility management node 108*b* determines that the UE 101 has become reachable by the second mobility management node 108*b*.

Step 902

This step corresponds to step 406 in FIG. 4 and step 608 in FIG. 6. The second mobility management node 108*b* receives, from a first mobility management node 108*a*, information about that there is updated subscriber data waiting to be transmitted to a gateway node 110. The received information may be an indication indicating that there is updated subscriber data waiting to be transmitted to the gateway node 110.

Step 903

This step corresponds to step 407 in FIG. 4 and step 611 in FIG. 6. The second mobility management node 108*b* receives the updated subscriber data from a subscriber database 128.

At least part of the updated subscriber data is modified. The updated subscriber data may comprise QoS parameters.

Step 904

This step corresponds to step 408 in FIG. 4 and step 613 in FIG. 6. The second mobility management node 108*b* transmits the updated subscriber data to the gateway node 110.

Step 905

This step corresponds to step 409 in FIG. 4, step 614 in FIG. 6 and step 705 in FIG. 7. In some embodiments, the second mobility management node 108*b* clears the indication when the updated subscriber data has been transmitted to the gateway node 110.

In some embodiments, the first mobility management node 108*a* is a MME and the second mobility management node 108*b* is a second MME. In other embodiments, the first mobility management node 108*a* is a first SGSN and the second mobility management node 108*b* is a second SGSN. In yet further embodiments, the first mobility management node 108*a* is a first combined MME and SGSN node and the second mobility management node 108*b* is a second combined MME and SGSN node. The gateway node 110 may be a SGW or a PGW or a combined SGW and PGW node.

Figure 10:
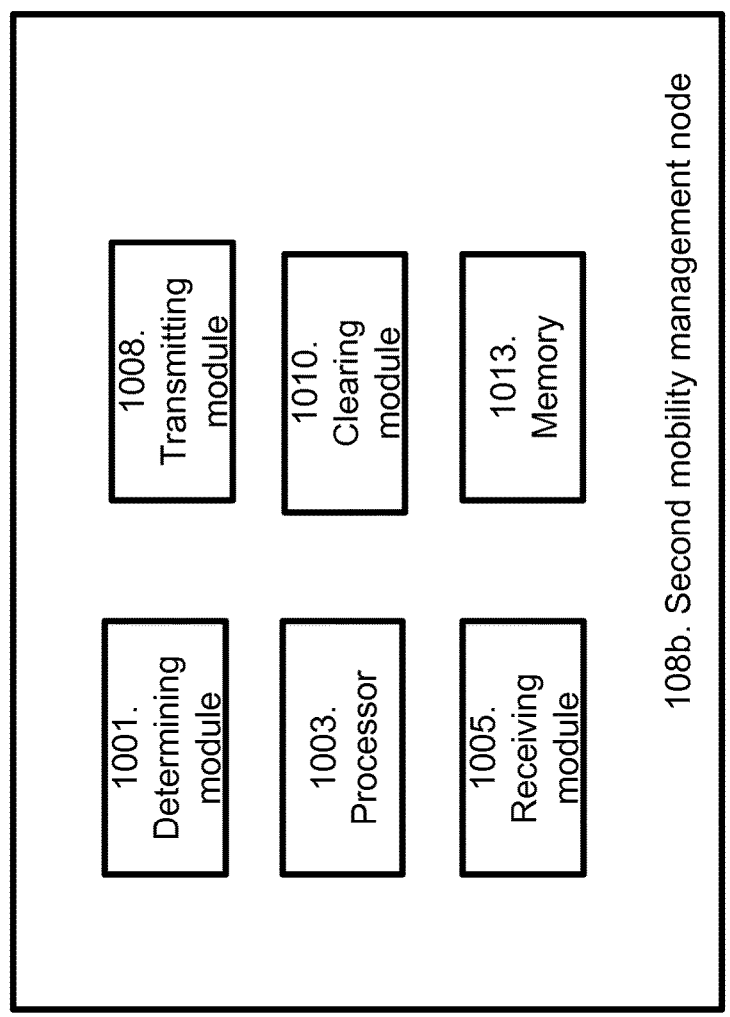
FIG. 10 is a schematic block diagram illustrating embodiments of the second mobility management node.

To perform the method steps shown in FIGS. 3, 4, 5, 6 and 9 for handling updated subscriber data associated with the UE 101, the second mobility management node 108*b* may comprise an arrangement as shown in FIG. 10.

The second mobility management node 108*b* is configured to, e.g. by means of a determining module 1001, determine that the UE 101 has become reachable by the second mobility management node 108*b*. The determining module 1001 may also be referred to as a determining circuit, determining means, determining unit, means for determining etc. The determining module 1001 may be a processor 1003 of the second mobility management node 108*b*.

The second mobility management node 108*b* is configured to, e.g. by means of a receiving module 1005, receive, from a first mobility management node 108*a*, information about that there is updated subscriber data waiting to be transmitted to a gateway node 110. In some embodiments, the received information is an indication indicating that there is updated subscriber data waiting to be transmitted to the gateway node 110. The receiving module 1005 may also be referred to as a receiving circuit, receiving means, receiving unit, means for receiving or an input unit. The receiving module 1005 may be a receiver, a transceiver etc. The receiving module 1005 may be a wireless receiver of the second mobility management node 108*b* of a wireless or fixed communications system.

The second mobility management node 108*b* is configured to, e.g. by means of the receiving module 1005, receive the updated subscriber data from a subscriber database 128. At least part of the updated subscriber data is modified. The updated subscriber data may comprise QoS parameters.

The second mobility management node 108b is configured to, e.g. by means of a transmitting module 1008, transmit the updated subscriber data to the gateway node 110. The transmitting module 1008 may also be referred to as a transmitting unit, a transmitting means, a transmitting circuit, means for transmitting or an output unit. The transmitting module 1008 may be a transmitter, a transceiver etc. The transmitting module 1008 may be a wireless transmitter of the second mobility management node 108b of a wireless or fixed communications system.

In some embodiments, the second mobility management node 108b is further configured to, e.g. by means of a clearing module 1010 clear the indication when the updated subscriber data has been transmitted to the gateway node 110. The clearing module 1010 may also be referred to as a clearing circuit, clearing means, clearing unit, means for clearing etc. The clearing module 1010 may be the processor 1003 of the second mobility management node 108b.

In some embodiments, the first mobility management node 108a is a first MME and the second mobility management node 108b is a second MME. In other embodiments, the first mobility management node 108a is a first SGSN and the second mobility management node 108b is a second SGSN. In yet another embodiment, the first mobility management node 108a is a first combined MME and SGSN node and the second mobility management node 108b is a second combined MME and SGSN node. The gateway node 110 may be a SGW or a PGW or a combined SGW and PGW node.

The second mobility management node 108b may further comprise a memory 1013 comprising one or more memory units. The memory 1013 is arranged to be used to store data, received data streams, power level measurements, updated subscriber data, modified subscriber data, indications, information about that the UE 101 is unreachable, threshold values, request messages, response messages, time periods, configurations, schedulings, and applications to perform the methods herein when being executed in the second mobility management node 108b.

Those skilled in the art will also appreciate that the determining module 1001, the receiving module 1005, the transmitting module 1008 and the clearing module 1010 described above may refer to a combination of analog and digital circuits, and/or one or more processors configured with software and/or firmware, e.g. stored in a memory, that when executed by the one or more processors such as the processor 1003 perform as described above. One or more of these processors, as well as the other digital hardware, may be included in a single ASIC, or several processors and various digital hardware may be distributed among several separate components, whether individually packaged or assembled into a SoC.

A second computer program may comprise instructions which, when executed on at least one processor, cause the at least one processor to carry out the method as described in FIGS. 3-6 and 9. A second carrier may comprise the second computer program. The second carrier may be one of an electronic signal, optical signal, radio signal or computer readable storage medium.

The present mechanism for handling subscriber data associated with the UE 101 may be implemented through one or more processors, such as a processor 805 in the first mobility management node arrangement depicted in FIG. 8 and a processor 905 in the second mobility management node arrangement depicted in FIG. 10, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the first mobility management node 108a and the second mobility management node 108b. One such carrier may be in the form of a CD ROM disc. It is however feasible with other data carriers such as a memory stick. The computer program code can furthermore be provided as pure program code on a server and downloaded to least one of the first mobility management node 108a and the second mobility management node 108b.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasized that the steps of the methods defined in the appended claims may, without departing from the embodiments herein, be performed in another order than the order in which they appear in the claims.

The invention claimed is:

1. A method in a first mobility management node for handling updated subscriber data associated with a User Equipment, UE, the UE being currently unreachable by the first mobility management node and wherein the updated subscriber data comprises Quality of Service, QoS, parameters, the method comprising: receiving, by the first mobility management node, from a subscriber database, updated subscriber data associated with the UE, wherein at least part of the updated subscriber data is modified;
determining, by the first mobility management node, that transmission of the updated subscriber data to a gateway node should be postponed until the UE has become reachable;
setting, by the first mobility management node, an indication indicating that there is updated subscriber data waiting to be transmitted to the gateway node;
determining, by the first mobility management node, that the UE has become reachable by a second mobility management node; and
transmitting, by the first mobility management node to the second mobility node, an indication indicating that there is updated subscriber data waiting to be transmitted to the gateway node.

2. The method according to claim 1, wherein the UE is unreachable when the UE is in suspend state or in power saving state or when a Paging Proceed Flag, PPF, associated with the UE is cleared in the first mobility management node.

3. The method according to claim 1, wherein the first mobility management node is a Mobility Management Entity, MME, or a Serving General packet radio service Support Node, SGSN, or a combined MME and SGSN node.

4. The method according to claim 1, wherein the second mobility management node is a Mobility Management Entity, MME, or a Serving General packet radio service Support Node, SGSN, or a combined MME and SGSN node.

5. The method according to claim 1, wherein the gateway node is a Serving GateWay, SGW, or a Packet data network GateWay, PGW or a combined SGW and PGW node.

6. The method according to claim 1, wherein the subscriber database is a Home Subscriber Server, HSS, or a Home Location Register, HLR.

7. A method in a second mobility management node for handling updated subscriber data associated with a User Equipment, UE wherein the updated subscriber data comprises Quality of Service, QoS, parameters, the method comprising:
  determining, by the second mobility management node, that the UE has become reachable by the second mobility management node;
  receiving, by the second mobility management node, from a first mobility management node, an indication indicating that there is updated subscriber data, received by the first mobility management node, waiting to be transmitted to a gateway node where a transmission of the updated subscriber data to the gateway node was postponed by the first mobility management node because the UE was unreachable;
  receiving, by the second mobility management node, the updated subscriber data from a subscriber database, wherein at least part of the updated subscriber data is modified;
  transmitting, by the second mobility management node, the updated subscriber data to the gateway node; and
  clearing, by the second mobility management node, the indication when the updated subscriber data has been transmitted to the gateway node.

8. The method according to claim 7, wherein the first mobility management node is a first Mobility Management Entity, MME, and the second mobility management node is a second MME, or
  wherein the first mobility management node is a first Serving General packet radio service Support Node, SGSN, and the second mobility management node is a second SGSN, or
  wherein the first mobility management node is a first combined MME and SGSN node and the second mobility management node is a second combined MME and SGSN node.

9. The method according to claim 7, wherein the gateway node is a Serving GateWay, SGW, or a Packet data network GateWay, PGW or a combined SGW and PGW node.

10. A first mobility management node for handling updated subscriber data associated with a User Equipment, UE wherein the updated subscriber data comprises Quality of Service, QoS, parameters, the UE being currently unreachable by the first mobility management node, the first mobility management node being configured to:
  receive, from a subscriber database, updated subscriber data associated with the UE, wherein at least part of the updated subscriber data is modified;
  determine that transmission of the updated subscriber data to a gateway node should be postponed until the UE has become reachable;
  set an indication indicating that there is updated subscriber data waiting to be transmitted to the gateway node;
  determine, that the UE has become reachable by a second mobility management node; and to
  transmit, to the second mobility node, information indicating that there is updated subscriber data waiting to be transmitted to the gateway node.

11. The first mobility management node according to claim 10, wherein the UE is unreachable when the UE is in suspend state or in power saving state or when a Paging Proceed Flag, PPF, associated with the UE is cleared in the first mobility management node.

12. The first mobility management node according to claim 10, wherein the first mobility management node is a Mobility Management Entity, MME, or a Serving General packet radio service Support Node, SGSN, or a combined MME and SGSN node.

13. The first mobility management node according to claim 10, wherein the second mobility management node is a Mobility Management Entity, MME, or a Serving General packet radio service Support Node, SGSN, or a combined MME and SGSN node.

14. The first mobility management node according to claim 10, wherein the gateway node is a Serving GateWay, SGW, or a Packet data network GateWay, PGW or a combined SGW and PGW node.

15. The first mobility management node according to claim 10, wherein the subscriber database is a Home Subscriber Server, HSS, or a Home Location Register, HLR.

16. A second mobility management node for handling updated subscriber data associated with a User Equipment, UE wherein the updated subscriber data comprises Quality of Service, QoS, parameters, the second mobility management node being configured to:
  determine that the UE has become reachable by the second mobility management node;
  receive, from a first mobility management node, an indication indicating that there is updated subscriber data, received by the first mobility management node, waiting to be transmitted to a gateway node where a transmission of the updated subscriber data to the gateway node was postponed by the first mobility management node because the UE was unreachable;
  receive the updated subscriber data from a subscriber database, wherein at least part of the updated subscriber data is modified;
  transmit the updated subscriber data to the gateway node; and
  clear the indication when the updated subscriber data has been transmitted to the gateway node.

17. The second mobility management node according to claim 16, wherein the first mobility management node is a first Mobility Management Entity, MME, and the second mobility management node is a second MME, or
  wherein the first mobility management node is a first Serving General packet radio service Support Node, SGSN, and the second mobility management node is a second SGSN, or
  wherein the first mobility management node is a first combined MME and SGSN node and the second mobility management node is a second combined MME and SGSN node.

18. The second mobility management node according to claim 16, wherein the gateway node is a Serving GateWay, SGW, or a Packet data network GateWay, PGW or a combined SGW and PGW node.

* * * * *

UNITED STATES PATENT AND TRADEMARK OFFICE
CERTIFICATE OF CORRECTION

| | |
|---|---|
| PATENT NO. | : 9,992,663 B2 |
| APPLICATION NO. | : 15/511187 |
| DATED | : June 5, 2018 |
| INVENTOR(S) | : Yang et al. |

It is certified that error appears in the above-identified patent and that said Letters Patent is hereby corrected as shown below:

On the Title Page

In Column 1, under "Notice", Line 3, delete "0 days. days." and insert -- 0 days. --, therefor.

In the Drawings

In Fig. 6, Sheet 6 of 10, for Step "615", in Line 1, delete "PGW" and insert -- SGW/PGW --, therefor.

In the Specification

In Column 2, Lines 49-50, delete "The 15 second" and insert -- The second --, therefor.

In Column 3, Line 8, delete "the 35 second" and insert -- the second --, therefor.

In Column 4, Line 34, delete "UE 01" and insert -- UE 101 --, therefor.

In Column 4, Line 57, delete "and the 35" and insert -- and the --, therefor.

In Column 6, Line 8, delete "E-UTRAN 101" and insert -- E-UTRAN 201 --, therefor.

In Column 6, Line 52, delete "E-UTRAN 101" and insert -- E-UTRAN 201 --, therefor.

In Column 11, Line 17, delete "second mobility management node 108a" and insert -- second mobility management node 108b --, therefor.

In Column 12, Line 1, delete "data." and insert -- data). --, therefor.

In Column 12, Line 13, delete "4. I" and insert -- 4. In --, therefor.

Signed and Sealed this
Eighteenth Day of September, 2018

Andrei Iancu
*Director of the United States Patent and Trademark Office*

CERTIFICATE OF CORRECTION (continued)
U.S. Pat. No. 9,992,663 B2

In Column 12, Line 67, delete "first MME 208" and insert -- first MME 208a --, therefor.

In Column 13, Line 34, delete "first MME 208," and insert -- first MME 208a, --, therefor.

In Column 14, Lines 48-49, delete "first MME 208" and insert -- first MME 208a --, therefor.

In Column 15, Line 14, delete "first MME 208," and insert -- first MME 208a, --, therefor.

In Column 15, Line 32, delete "the 25 second" and insert -- the second --, therefor.

In Column 15, Lines 66-67, delete "second MME 208a" and insert -- second MME 208b --, therefor.

In Column 16, Line 6, delete "second MME 208a." and insert -- second MME 208b. --, therefor.

In Column 16, Lines 16-17, delete "second MME 208a" and insert -- second MME 208b --, therefor.

In Column 17, Line 26, delete "step, 604" and insert -- step 604 --, therefor.

In Column 19, Line 8, delete "by a 15" and insert -- by a --, therefor.

In Column 21, Line 64, delete "processor 905" and insert -- processor 1003 --, therefor.

In the Claims

In Column 23, Line 7, in Claim 5, delete "PGW" and insert -- PGW, --, therefor.

In Column 23, Line 50, in Claim 9, delete "PGW" and insert -- PGW, --, therefor.

In Column 24, Line 23, in Claim 14, delete "PGW" and insert -- PGW, --, therefor.

In Column 24, Line 63, in Claim 18, delete "PGW" and insert -- PGW, --, therefor.